(12) United States Patent
Preston et al.

(10) Patent No.: US 11,585,319 B2
(45) Date of Patent: Feb. 21, 2023

(54) WIND TURBINE BLADE MANUFACTURE

(71) Applicant: Vestas Wind Systems A/S, Aarhus N. (DK)

(72) Inventors: Robert Charles Preston, Gurnard (GB); Sean Keohan, Shanklin (GB); Andrew Hedges, Surbiton (GB)

(73) Assignee: Vestas Wind Systems A/S, Aarhus N (DK)

( * ) Notice: Subject to any disclaimer, the term of this patent is extended or adjusted under 35 U.S.C. 154(b) by 146 days.

(21) Appl. No.: 16/761,506

(22) PCT Filed: Nov. 6, 2018

(86) PCT No.: PCT/DK2018/050284
§ 371 (c)(1),
(2) Date: May 5, 2020

(87) PCT Pub. No.: WO2019/091530
PCT Pub. Date: May 16, 2019

(65) Prior Publication Data
US 2021/0180560 A1 Jun. 17, 2021

(30) Foreign Application Priority Data
Nov. 7, 2017 (DK) .......................... PA 2017 70831

(51) Int. Cl.
*B29C 65/50* (2006.01)
*F03D 1/06* (2006.01)
(Continued)

(52) U.S. Cl.
CPC ........ *F03D 1/0675* (2013.01); *B29C 65/4835* (2013.01); *B29C 65/5057* (2013.01);
(Continued)

(58) Field of Classification Search
CPC .............. F03D 1/0675; B29C 65/4835; B29C 65/5057; B29C 65/7802; B29C 66/1122;
(Continued)

(56) References Cited

U.S. PATENT DOCUMENTS 8,317,483 B2 * 11/2012 Gerber .................. F03D 1/0608
416/238
9,199,301 B2 * 12/2015 Rajasingam .......... B29C 66/636
(Continued)

FOREIGN PATENT DOCUMENTS

CN 102554817 A * 7/2012
WO 2008089765 A2 7/2008
(Continued)

OTHER PUBLICATIONS

Danish Patent and Trademark Office, Search and Examination Report in PA 2017 70831, dated Apr. 30, 2018.
(Continued)

*Primary Examiner* — Ryan J. Walters
(74) *Attorney, Agent, or Firm* — Wood Herron & Evans LLP

(57) ABSTRACT

Improvements relating to wind turbine blade manufacture 5 A method of making a wind turbine blade is described. The method involves providing a blade shell having an inner surface defining a mounting region and positioning a web in the mounting region. One or more web restraining devices are used to secure the position of the web in the mounting region. Each restraining device has a first portion attached to the web and a second portion attached to the inner surface of the blade shell. The 10 restraining devices are configured to prevent movement of the web in a first plane substantially parallel to the mounting region and to permit movement of the web in a second plane substantially perpendicular to the mounting region. The method further comprises moving the
(Continued)

web in the second plane away from the mounting region and performing one or more preparatory operations on the mounting region with the web 15 moved away from the mounting region. The web is then repositioned in the mounting region by moving the web in the second plane back towards the mounting region.

13 Claims, 6 Drawing Sheets

(51) Int. Cl.
*B29C 65/48* (2006.01)
*B29C 65/78* (2006.01)
*B29C 65/00* (2006.01)
*B29L 31/08* (2006.01)

(52) U.S. Cl.
CPC ...... *B29C 65/7802* (2013.01); *B29C 66/1122* (2013.01); *B29C 66/131* (2013.01); *B29C 66/3452* (2013.01); *B29C 66/524* (2013.01); *B29C 66/532* (2013.01); *B29C 66/54* (2013.01); *B29C 66/61* (2013.01); *B29C 66/636* (2013.01); *B29C 66/7212* (2013.01); *B29C 66/72141* (2013.01); *B29L 2031/085* (2013.01)

(58) Field of Classification Search
CPC . B29C 66/131; B29C 66/3452; B29C 66/524; B29C 66/532; B29C 66/54; B29C 66/61; B29C 66/636; B29C 66/7212; B29C 65/483; B29C 66/112; B29C 66/721; B29C 66/72141; B29L 2031/085; Y02E 10/72; Y02P 70/50; B29D 99/0028
See application file for complete search history.

(56) References Cited

U.S. PATENT DOCUMENTS

| | | | | |
|---|---|---|---|---|
| 9,458,823 | B2* | 10/2016 | Liu | ............... F03D 1/0675 |
| 10,864,690 | B2* | 12/2020 | Wardropper | ....... B29D 99/0028 |
| 2010/0003141 | A1* | 1/2010 | Hancock | ............ B29D 99/0028 |
| | | | | 416/223 R |
| 2011/0126978 | A1 | 6/2011 | Gau | |
| 2011/0229333 | A1 | 9/2011 | Flach | |
| 2012/0027613 | A1 | 2/2012 | Yarbrough | |
| 2013/0239379 | A1* | 9/2013 | Rajasingam | ............ B29C 33/12 |
| | | | | 29/889.7 |

FOREIGN PATENT DOCUMENTS

| | | |
|---|---|---|
| WO | 2012019610 A1 | 2/2012 |
| WO | 2015003717 A1 | 1/2015 |
| WO | 2017045690 A1 | 3/2017 |
| WO | 2017088890 A1 | 6/2017 |

OTHER PUBLICATIONS

European Patent Office, International Search Report and Written Opinion in PCT Application No. PCT/DK2018/050284, dated Jan. 14, 2019.

* cited by examiner

WIND TURBINE BLADE MANUFACTURE

TECHNICAL FIELD

The present invention relates to wind turbine blades and to methods of making wind turbine blades.

BACKGROUND

Modern wind turbine blades typically comprise a hollow shell made up of two half-shells bonded together along leading and trailing edges of the shells. One or more longitudinally-extending shear webs are provided within the internal cavity of the blade. A shear web comprises a web panel disposed between upper and lower mounting flanges. The mounting flanges are bonded respectively to opposed inner surfaces of the two half-shells.

In order to bond a shear web to a half shell, a line of adhesive is typically applied to the inner surface of the half shell in a predefined shear web mounting region. The shear web is then lifted and positioned on top of the adhesive. Once the adhesive has been deposited, the shear web must be rapidly positioned before the adhesive begins to cure.

It is important that the shear webs are bonded to the half shells in precise locations according to the design specification of the wind turbine blade. An assembly jig is typically used to align and support the shear web during the bonding process. The assembly jig is capable of moving the shear web rapidly and accurately into the required position after the adhesive has been deposited.

Whilst assembly jigs work well to support the shear web and produce consistent results, they have several drawbacks. Firstly, such jigs are expensive to produce and purchase. Secondly, the jigs are complex assemblies to install and configure, resulting in long lead times. Thirdly, the jigs are bespoke for a particular blade type, and it is generally not possible to use the same jig for different types or sizes of blade. Fourthly, in view of its large size, the jig occupies a significant portion of the floor space in the blade factory, where space is always at a premium.

It is therefore desirable to seek alternative manufacturing techniques that do not rely on assembly jigs for supporting the shear web during the manufacturing process.

Against this background the present invention has been made.

SUMMARY OF THE INVENTION

According to a first aspect of the present invention there is provided a method of making a wind turbine blade, the method comprising: providing a blade shell having an inner surface defining a mounting region; positioning a web in the mounting region; securing the position of the web in the mounting region using one or more web restraining devices, each device having a first portion attached to the web and a second portion attached to the inner surface of the blade shell, each device being configured to prevent movement of the web in a first plane substantially parallel to the mounting region and to permit movement of the web in a second plane substantially perpendicular to the mounting region; moving the web in the second plane away from the mounting region; performing one or more preparatory operations on the mounting region with the web moved away from the mounting region; and repositioning the web in the mounting region by moving the web in the second plane back towards the mounting region.

Moving the web in the second plane may cause the one or more web restraining devices to move between a first configuration and a second configuration. The or each web restraining device preferably secures the position of the web in the mounting region when in the first configuration.

The or each web restraining device may be substantially straight in the first configuration. At least a portion of the or each web restraining device may be bent or curved when in the second configuration.

The or each web restraining device may be in the form of a strip. Preferably at least a portion of the strip is flexible. Part or all of the strip may be formed from composite material, for example glass-fibre reinforced plastic (GFRP). At least a portion of the strip may have a laminate structure comprising one or more layers of reinforcing fibres embedded in a cured matrix. The strip may have a hybrid structure in which a first portion of the strip is relatively stiff and a second portion of the strip is relatively flexible.

The method may further comprise bonding the web to the mounting region using an adhesive. The adhesive preferably also bonds the first portion of the or each strip in place between the web and the mounting region.

The method may comprise bonding the second portion of the web restraining device to the inner surface of the blade shell, preferably using a fast-curing adhesive. The first portion of the restraining device may be bonded to the web, preferably using a structural adhesive.

Moving the web in the second plane may comprise lifting and turning the web. The web may be moved substantially along an arcuate path in the second plane.

The one or more preparatory operations may comprise applying adhesive to the mounting region and/or applying adhesive to the web and/or preparing adhesive and/or removing a peel ply layer from the mounting region.

The step of positioning the web in the mounting region may comprise: arranging a web position guide in a predefined location of the mounting region and arranging the web in abutment with the web position guide. The method may further comprise removing the web position guide once the web has been positioned. The step of securing the position of the web in the mounting region is preferably performed prior to removing the web position guide.

The web may be any web. In a particular example the web is a trailing-edge web for supporting the trailing edge of a wind turbine blade.

The method preferably comprises providing a plurality of web restraining devices, the devices being spaced at intervals along the length of the web.

According to a second aspect of the present invention there is provided a wind turbine blade comprising a blade shell and a web bonded to an inner surface of the blade shell, wherein the wind turbine blade further comprises one or more web restraining devices having a first portion attached to the web and a second portion attached to the inner surface of the blade shell, each device being configured to prevent movement of the web in a first plane substantially parallel to the mounting region and to permit movement of the web in a second plane substantially perpendicular to the mounting region during manufacture of the blade prior to bonding the web to the blade shell.

BRIEF DESCRIPTION OF THE DRAWINGS

Embodiments of the invention will now be described in further detail by way of non-limiting example with reference to the accompanying drawings, in which.

DETAILED DESCRIPTION

Figure 1:
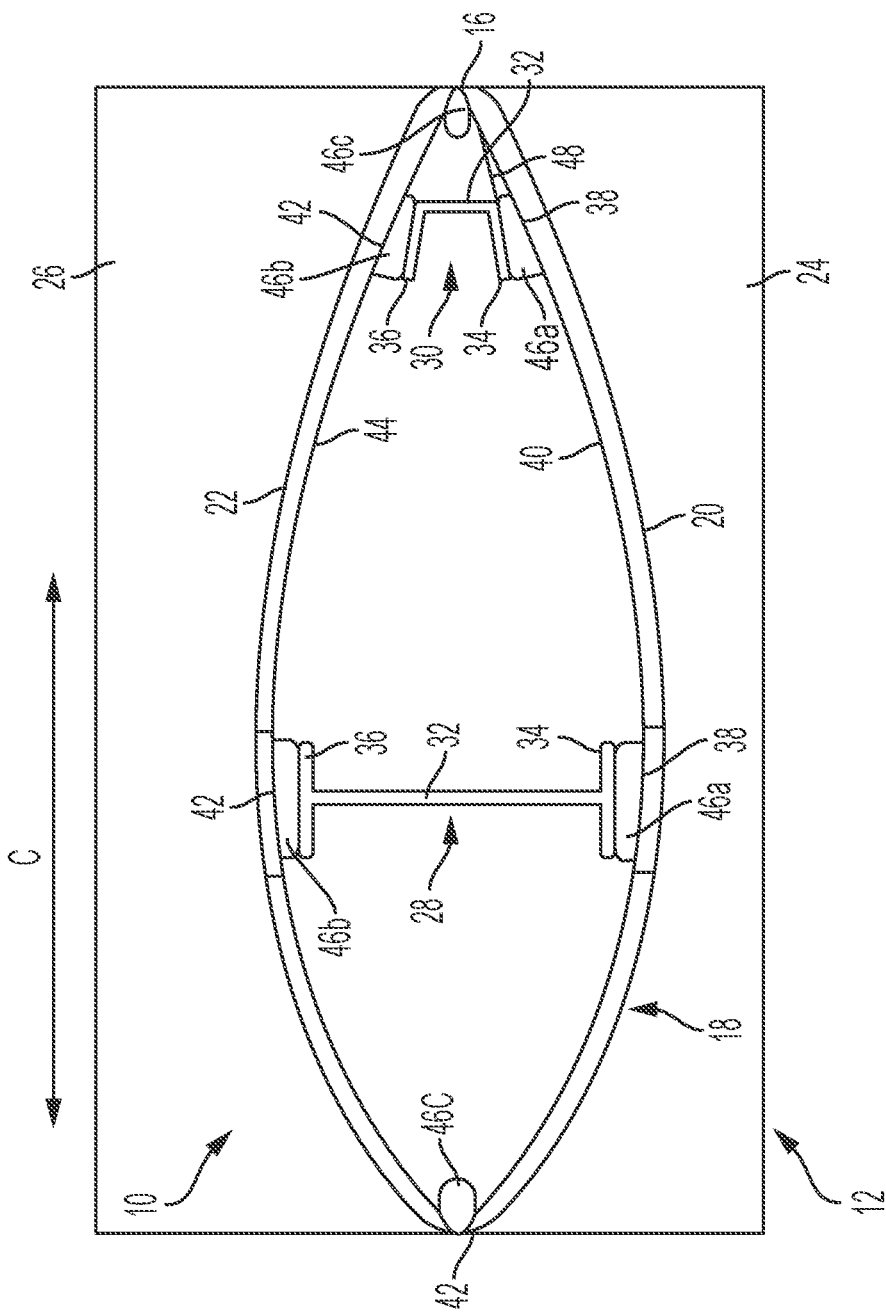
FIG. 1 is a schematic cross-sectional view of a wind turbine blade mould assembly supporting a wind turbine blade according to an embodiment of the invention.

In the following description, the same reference numerals will be used for equivalent features across all embodiments.

FIG. 1 is a schematic cross-sectional view of a wind turbine blade 10 supported in a wind turbine blade mould assembly 12 during manufacture of the blade 10. The blade 10 extends in a chordwise direction C between a leading edge 14 and a trailing edge 16. The blade 10 also extends longitudinally between a root end (not shown) and a tip end (not shown) in a spanwise direction, which is generally perpendicular to the page.

The blade 10 comprises an outer shell 18 formed of first and second half shells 20, 22, e.g. a windward half shell 20 and a leeward half shell 22. The first half shell 20 is supported by a first half mould 24 of the mould assembly 12 and the second half shell 22 is supported by a second half mould 26 of the mould assembly 12. The mould assembly 12 is shown in a closed configuration in which the second half mould 26 is positioned on top of the first half mould 24. This is the final stage in the blade manufacturing process, when the two half shells 20, 22 are bonded together to form the complete blade 10.

The blade 10 includes first and second shear webs 28, 30. The shear webs extend longitudinally in the spanwise direction, i.e. generally perpendicular to the page. The first shear web 28 is the main shear web and is positioned in the thickest section of the blade, i.e. where the first and second half shells 20, 22 are furthest apart. The second shear web 30 in this example is a trailing-edge web and is located near the trailing edge 16 of the blade 10. The trailing-edge web 30 provides additional shear support near the trailing edge 16.

The first shear web 28 in this example is substantially I-shaped in cross-section, whilst the second shear web 30 in this example is substantially C-shaped in cross section. Each shear web 28, 30 comprises a web panel 32 disposed between first and second mounting flanges 34, 36. The first mounting flanges 34 are bonded respectively to first mounting regions 38 defined on an inner surface 40 of the first half shell 20 and the second mounting flanges 36 are bonded respectively to second mounting regions 42 defined on an inner surface 44 of the second half shell 22.

The process of bonding the shear webs 28, 30 to the half shells 20, 22 involves first depositing adhesive 46*a* on the inner surface 40 of the first half shell 20. This is performed before the mould assembly 12 is closed. The shear webs 28, 30 are then lifted and positioned on top of this adhesive 46*a*. Further adhesive 46*b* may then be applied on top of the second mounting flanges 36 of the shear webs 28, 30. Adhesive 46*c* is also applied along the leading and trailing edges 14, 16 of the first half shell 20. The mould assembly 12 is then closed causing the second half shell 22 to bear down on the first half shell 20 and the adhesive 46*a*, 46*b*, 46*c* in the various bond lines to be compressed.

Once the adhesive 46*a*, 46*b*, 46*c* has been deposited, the various components must be assembled quickly and positioned accurately before the adhesive 46*a*, 46*b*, 46*c* begins to cure. To facilitate the accurate placement of the shear webs 28, 30 following adhesive deposition, one or more restraining devices 48 may be used in accordance with an example of the present invention. As shown in FIG. 1, a restraining device 48 is attached between the trailing edge web 30 and the inner surface 40 of the first half shell 20 in this example. The form and function of exemplary restraining devices will now be described in further detail with reference to the remaining figures.

Figure 2:
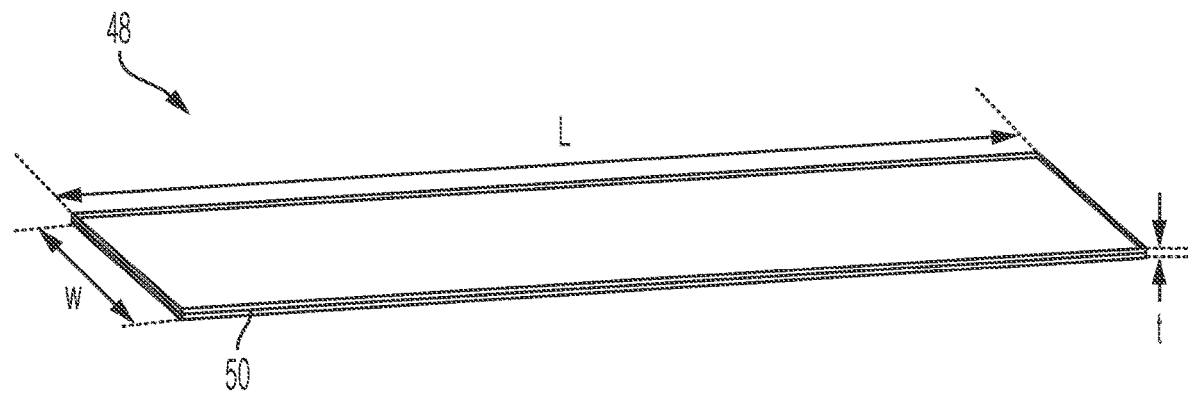
FIG. 2 is a schematic perspective view of a restraining device in the form of a strip.

Referring to FIG. 2, this shows a first embodiment of a restraining device 48. The restraining device 48 in this embodiment is in the form of a strip. The strip 48 in this example is shaped as an elongate rectangle. The strip 48 has a laminate structure comprising one or more layers 50 of reinforcing fibres embedded in a cured resin matrix. The strip 48 is elongate and has a length l, a width w and a thickness t, as indicated on FIG. 2. The length l of the strip 48 is greater than its width w, and the width w of the strip 48 is greater than its thickness t. In this example the strip 48 is relatively thin, in that its thickness t is significantly less than in its width w. The strip 48 is therefore relatively thin and flexible. The strip 48 in this example has a length l of approximately 350 mm; a width w of approximately 50 mm and a thickness t of less than 1 mm, although the strip 48 may have other suitable dimensions in other embodiments.

Figure 3:
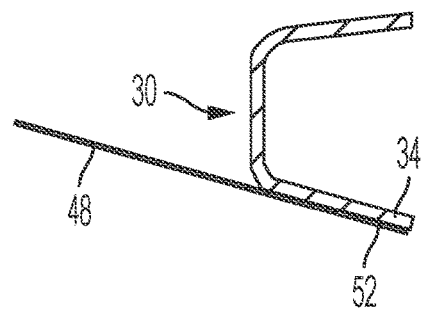
FIG. 3 is a schematic cross-sectional view showing the restraining the device attached to a first mounting flange of the web.

FIGS. 3-9 schematically illustrate the use of the restraining device 48 during the blade manufacturing process. Referring to FIG. 3, this is a schematic cross sectional view showing the strip 48 attached to the trailing edge web 30. In this example a first end portion 52 of the strip 48 is attached to the first mounting flange 34 of the trailing edge web 30. A structural adhesive such as an epoxy adhesive is preferably used to bond the strip 48 to the web 30. Preferably a plurality of such strips 48 are attached to the web 30 at spaced intervals along the length of the web 30.

Figure 4:
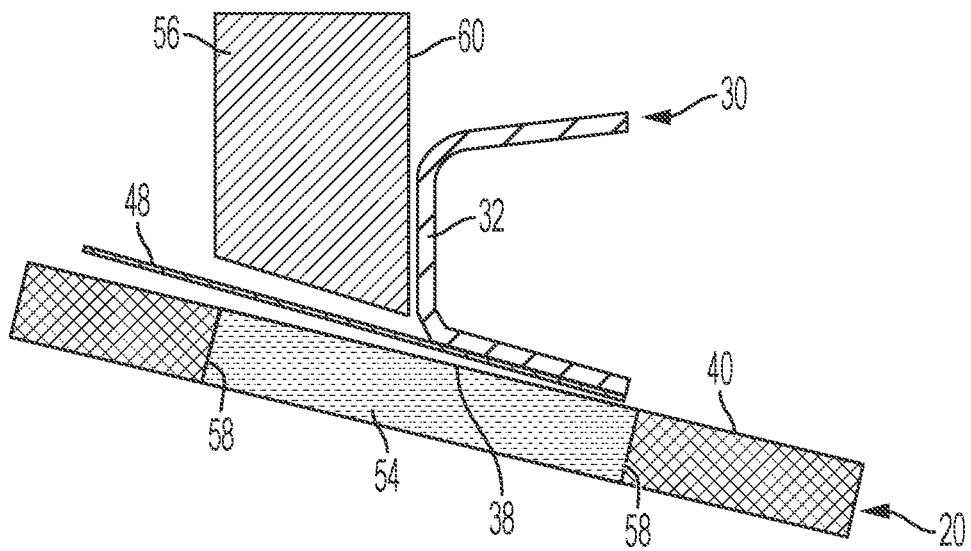
FIG. 4 is a schematic cross-sectional view showing the web positioned in a mounting region of a first half shell in abutment with a web locating device.

Referring to FIG. 4, the shear web 30 with the restraining device(s) 48 attached is positioned on the inner surface 40 of the first half shell 20. The shear web is positioned in the shear web mounting region 38 of the first half shell 20. The mounting region 38 in this example is defined by a spar cap 54, which is embedded within the half shell 20. The spar cap 54 may be formed form one or more carbon-fibre pultrusions, and is preferably formed from a stack of pultrusions.

A web position guide 56 is temporarily positioned in the mounting region 38 and aligned with an edge 58 of the spar cap 54. The web 30 is then butted up against a guide surface 60 of the web position guide 56. The web position guide 56 is dimensioned such that when it is aligned with the edge 58 of the spar cap 54, the guide surface 60 is aligned with the centre of the spar cap 54. The web panel 32 of the shear web 30 is therefore centralised relative to the spar cap 54 when butted up against the guide surface 60. One or more web position guides 56 may be used in practice to align the shear web 30.

Figure 5:
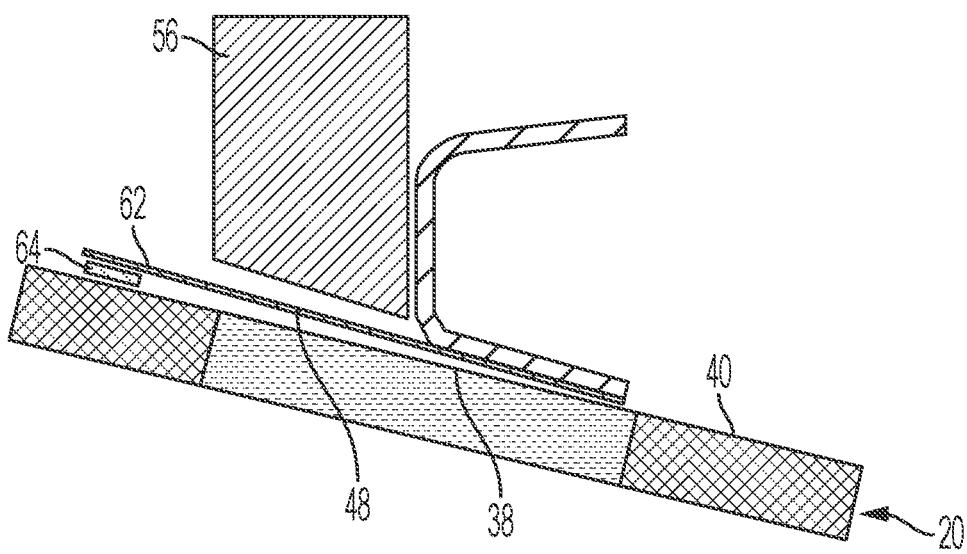
FIG. 5 corresponds to FIG. 4 and additionally shows an end portion of the restraining device secured to a surface of the first half shell.

Referring to FIG. 5, with the shear web 30 accurately positioned in the mounting region 38, a second end portion 62 of the restraining device 48 is secured to the inner surface 40 of the first half shell 20. In this example, the second end portion 62 of the strip 48 is bonded to the inner surface 40 of the first half shell 20. Preferably a fast-curing adhesive 64, e.g. a polyurethane or epoxy adhesive is used to bond the strip 48 to the half shell 20. The other restraining devices 48 (if used) are similarly attached to the inner surface 40 of the first half shell 20. Once the adhesive 64 has cured, the web position guide(s) 56 may be removed. The restraining device(s) 48 maintain the accurate position of the shear web 30 in the mounting region 38 and prevent the shear web 30 from moving in a first plane substantially parallel to the mounting region 38. In the schematic view of FIG. 5, the first plane is perpendicular to the plane of the page.

Figure 6:
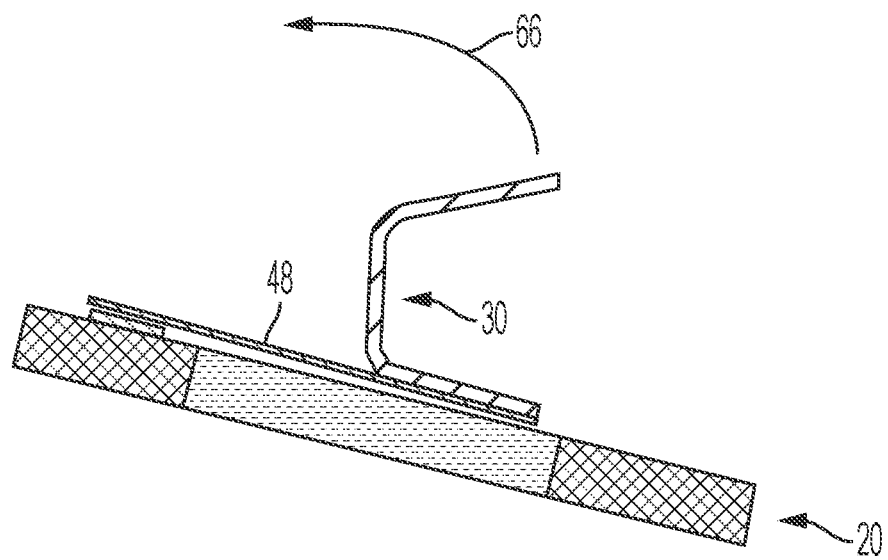
FIG. 6 corresponds to FIG. 5, with the web locating device removed and the restraining device fixing the position of the web in the mounting region.

Referring to FIG. 6, with the restraining device(s) 48 secured to both the shear web 30 and the half shell 20, the shear web 30 may then be moved away from the mounting region. The shear web 30 is moved in a second plane perpendicular to the first plane. In this example, the second plane corresponds to the plane of the page. Moving the shear web 30 in the second plane may be accomplished by lifting and turning the shear web 30. The shear web 30 moves along an arcuate path in the second plane, as indicated by the arrow 66 in FIG. 6.

Figure 7:
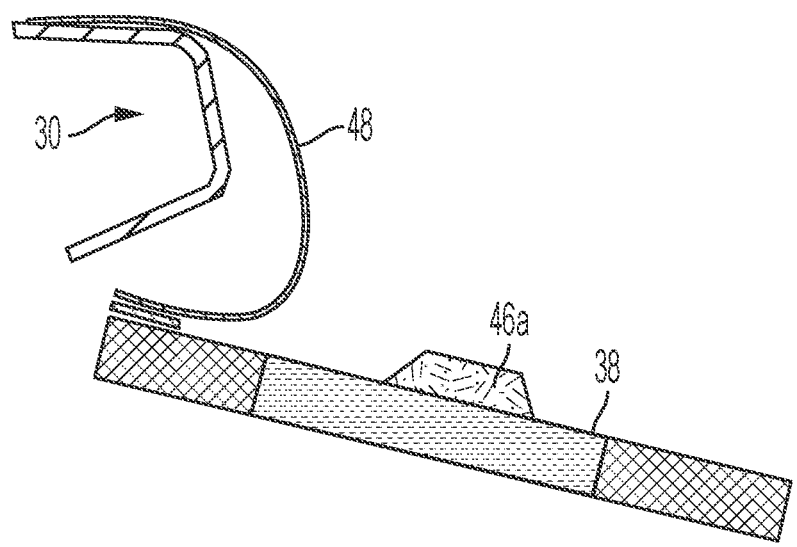
FIG. 7 is a schematic cross-sectional view showing the web having been moved away from the mounting region to permit adhesive deposition in the mounting region.

Referring to FIG. 7, this shows the shear web 30 having been moved in the second plane away from the mounting region 38. It can be seen that the strip 48 is curved when the shear web 30 is moved away from the mounting region 38. The flexibility of the strip 48 permits movement of the shear web 30 in the second plane.

In general terms, moving the web 30 in the second plane causes the web restraining device 48 to move between a first configuration and a second configuration. In this particular example, the web retraining device 48 is substantially straight in the first configuration (see FIG. 6) whilst in the second configuration (shown in FIG. 7), the web restraining device 48 is bent or curved.

Referring still to FIG. 7, with the shear web 30 moved clear of the mounting region 38, one or more surface preparations may be performed on the mounting region 38. For example a peel ply layer may be removed from the mounting region and/or the adhesive may be prepared. A strip of adhesive 46a is then deposited along the length of the mounting region 38.

Figure 8:
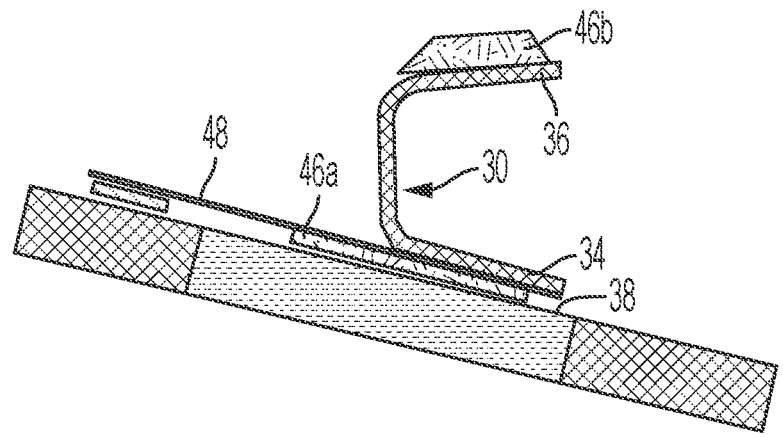
FIG. 8 shows the web repositioned in the mounting region and further adhesive disposed on a second mounting flange of the web.

Referring to FIG. 8, after the adhesive 46a has been deposited, the shear web 30 is moved back into position with its first mounting flange 34 now sitting on top of the adhesive 46a. As the restraining device 48 prevents movement of the shear web 30 in the plane of the mounting region 38, the shear web 30 returns to its correct position without any further alignment being required. The shear web 30 can therefore be quickly positioned with accuracy on top of the adhesive 46a. Further adhesive 46b is then deposited on top of the second mounting flange 36 of the shear web 30 ready for bonding the shear web 30 to the second half shell 22 (shown in FIG. 9).

Figure 9:
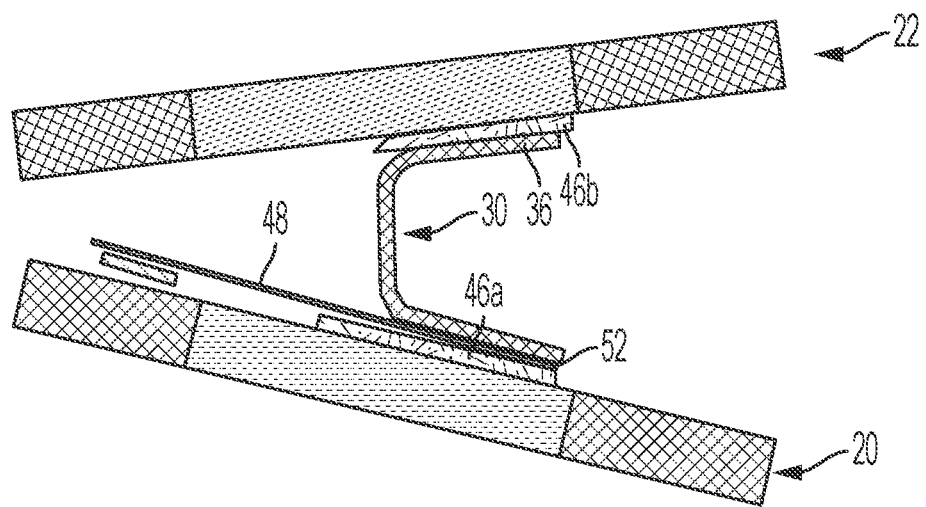
FIG. 9 shows the web being bonded between the first half shell and a second half shell.

Referring to FIG. 9, the second half shell 22 is then positioned on top of the first half shell 20. As described above with reference to FIG. 1, this may be achieved by closing the blade mould assembly 12. The second half shell 22 bears down on the shear web 30 causing compression of the adhesive 46a, 46b above and below the web 30. Once the adhesive 46a, 46b has cured, the mould assembly 12 may be opened and the blade 10 removed.

The restraining devices 48 also serve to maintain the position of the shear web 30 during the mould closing procedure and during curing of the adhesive 46a, 46b by preventing the shear web 30 from moving in the chordwise direction C. Advantageously, the restraining devices 48 permit some vertical movement of the shear web 30 so that the web 30 can settle in the available space between the half shells 20, 22.

With the shear web 30 bonded to the blade shells 20, 22, the first end 52 of the or each restraining device 48 is secured between the shear web 30 and the half shell 20. This is advantageous as it results in the restraining device 48 being permanently secured in the blade 10 so that it cannot subsequently become detached inside the blade 10. Preferably the same adhesive is used to bond the restraining device 48 to the web 30 as is used to bond the web 30 to the blade shell 20, e.g. a structural adhesive. The composite materials forming the strip 48 are also preferably the same or similar to the materials used to form the shear web 30, e.g. glass-fibre reinforced plastic (GFRP). The use of such similar and compatible materials ensures that the strips 48 are well integrated in the shear web bond line and are not regarded as a defect in the bond line.

Figure 10:
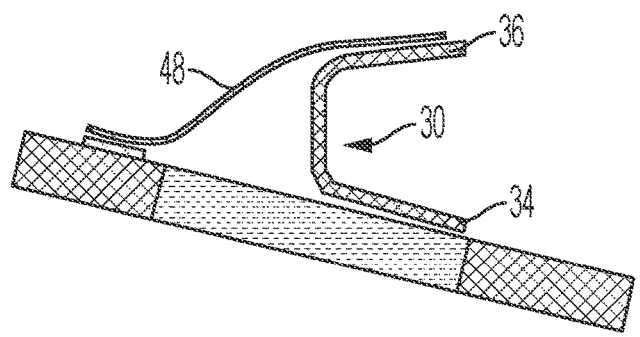
FIG. 10 shows a restraining device attached to the second mounting flange of the web.

In certain embodiments, a restraining device 48 may be attached to the second mounting flange 36 of the shear web 30. An example of this is shown in FIG. 10. In a particularly advantageous arrangement, one or more restraining devices 48 may be attached to the first mounting flange 34 (for example as shown in FIG. 6) and one or more restraining devices 48 may be attached to the second mounting flange 36 (for example as shown in FIG. 10). The use of restraining devices 48 connected to both mounting flanges 34, 36 of the shear web 30 provides additional restraint for the shear web 30 and further prevents the possibility of the shear web 30 moving away from its correct position.

Figure 11:
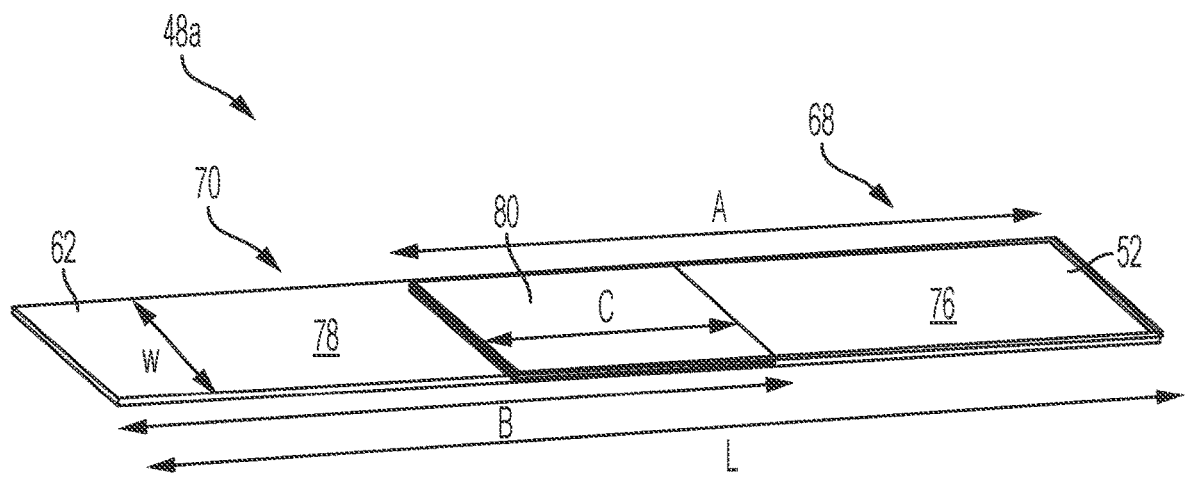
FIG. 11 is a schematic perspective view of a hybrid restraining device comprising stiff and flexible portions.

FIG. 11 shows a second embodiment of a restraining device 48a. In this example the restraining device 48a is a so-called 'hybrid' strip and comprises a relatively stiff first portion 68 and a relatively flexible second portion 70. The relatively stiff first portion 68 comprises a first end portion 52 of the strip 48a and the relatively flexible second portion 70 comprises a second end portion 62 of the strip 48a.

The strip 48a is formed from a first relatively stiff strip 76 and a second relatively flexible strip 78, which are bonded together in an overlap region 80 of the hybrid strip 48a. In this example, the first strip 76 has a length A of approximately 200 mm, the second strip 78 has a length B of approximately 150 mm, and the overlap region 80 has a length C of approximately 50 mm. Each strip 76, 78 has a width w of approximately 50 mm. The hybrid strip 48a therefore has a length l of approximately 300 mm and a width w of approximately 50 mm. The dimensions of the hybrid strip 48a may be selected according to the design and size of the web 30 and therefore may have any other suitable dimensions in other embodiments.

The first and second strips 76, 78 may each have a laminate structure, for example they may be formed of one or more plies of reinforcing fibres in a cured resin matrix. The increased relative stiffness of the first strip 76 may be accomplished by using more reinforcing plies in the first strip 76 in comparison to the second strip 78. Alternatively, the first strip 76 may incorporate more resin than the second strip 78. Alternatively, only the first strip 76 may have a laminate structure and the second strip 78 may comprise a non-laminate material, for example it may be a strip of polymer material. It will be appreciated that numerous possibilities exist for forming such a 'hybrid' strip 48a having both stiff and flexible portions 68, 70.

The relatively stiff first portion 68 of the hybrid strip 48a is preferably attached to the shear web 30, whilst the relatively flexible portion 70 of the hybrid strip 48a is preferably attached to the half shell 20. The flexibility of the second portion 70 of the strip 48a permits turning of the shear web 30 (as shown in FIGS. 6 and 7), whilst the stiffness of the first portion 68 resists any rotation of the web 30 in the first plane parallel to the shear web mounting region 38.

The restraining devices 48, 48a described above present a number of advantages. In summary, the restraining devices 48, 48a enable the shear web 30 to be positioned accurately prior to the assembly process. The web 30 can then be temporarily moved to allow other processes (e.g. peel ply removal, adhesive preparation and application) to be performed. The web 30 may then be re-positioned accurately without further alignment or re-work being required. The restraining devices 48, 48a maintain the chordwise position of the web during blade mould closure and adhesive curing, but allow vertical movement for the web 30 to settle in the available space. The restraining devices 48, 48a are contained between the web 30 and the blade 10 which eliminates the risk of them becoming loose inside the blade 10, i.e. they are secured in place. The restraining devices 48, 48a can be formed of similar materials to the rest of the blade 10, and bonded using the same structural adhesives so that they do not constitute a defect in the web bond line. The use of hybrid restraining devices 48a comprising both stiff and flexible portions 68, 70 further resists any web 30 movement in the first plane whilst permitting the web 30 to be moved in the second plane.

A significant advantage of the restraining devices 48, 48a is that they remove the requirement for large assembly jigs for supporting and aligning the shear webs 28, 30. The present invention therefore provides a significant cost saving in the blade manufacturing process and reduces lead times associated with jig procurement and configuration. The use of restraining devices 48, 48a can also readily accommodate changes in the blade design without long lead times associated with obtaining new jigs or reconfiguring existing jigs. The restraining devices 48, 48a also allow the blade 10 to be joined together in a single stage, i.e. the shear webs 28, 30 can be bonded simultaneously to the first and second half shells 20, 22. This is not possible when using a jig because the jig must be removed before mould closure, which necessitates a two-stage join up process whereby the webs 28, 30 must first be bonded to one half shell 20 before subsequently being bonded to the other half shell 22. The ability to dispense with jigs therefore provides a significant cost and time saving across the entire blade assembly procedure.

Many modifications may be made to the specific examples above without departing from the scope of the present invention as defined in the accompanying claims. For example, whilst the restraining devices 48, 48a described above are in the form of strips, in other embodiments the restraining devices 48, 48a could have any other suitable structure that restricts movement of the web 30 in the first plane whilst permitting movement of the web 30 away from the mounting region 38 in the second plane. For example, the restraining devices 48, 48a could be in the form of hinges. Alternatively, a rod or other structure could be secured to the shell 20 adjacent to the mounting region 38 and the web 30 may be attached to the rod via one or more pivoting connectors. Whilst the web 30 in the above examples has a C-shaped cross-section, in other examples the web 30 may have a different shape. The invention is also not limited to trailing-edge webs 30, and the restraining devices may be used in connection with other webs. Whilst the restraining devices 48, 48a are directly attached to the web 30 and half shell 20 in the above examples, the restraining devices 48, 48a may be indirectly attached in other examples. For example, the restraining devices 48, 48a may be secured to an intermediate body, which may in turn be secured to the shear web 30 or half shell 20.

The invention claimed is:

1. A method of making a wind turbine blade, the method comprising:
   providing a blade shell having an inner surface defining a mounting region;
   positioning a web in the mounting region;
   securing the position of the web in the mounting region using one or more web restraining devices, each of the one or more web restraining devices having a first portion attached to the web and a second portion attached to the inner surface of the blade shell, each of the one or more web restraining devices being configured to prevent movement of the web in a first plane substantially parallel to the mounting region and to permit movement of the web in a second plane substantially perpendicular to the mounting region;
   moving the web in the second plane away from the mounting region, wherein moving the web in the second plane causes the one or more web restraining devices to move between a first configuration and a second configuration, and wherein each of the one or more web restraining devices secures the position of the web in the mounting region when in the first configuration;
   performing one or more preparatory operations on the mounting region with the web moved away from the mounting region; and
   repositioning the web in the mounting region by moving the web in the second plane back towards the mounting region.

2. The method of claim 1, wherein each of the one or more web restraining devices is substantially straight in the first configuration and at least a portion of each of the one or more web restraining device is curved when in the second configuration.

3. The method of claim 1, wherein each of the one or more web restraining devices is in the form of a strip and wherein at least a portion of the strip is flexible.

4. The method of claim 3, wherein the strip has a laminate structure comprising one or more layers of reinforcing fibres embedded in a cured matrix.

5. The method of claim 3, wherein the method further comprises bonding the web to the mounting region using an adhesive and wherein said adhesive also bonds the first portion of the strip in place between the web and the mounting region.

6. The method of claim 1, further comprising bonding the second portion of the one or more web restraining device to the inner surface of the blade shell.

7. The method of claim 1, wherein moving the web in the second plane comprises lifting and turning the web.

8. The method of claim 1, wherein the web is moved substantially along an arcuate path in the second plane.

9. The method of claim 1, wherein the one or more preparatory operations comprise applying adhesive to the mounting region and/or applying adhesive to the web and/or preparing adhesive and/or removing a peel ply layer from the mounting region.

10. The method of claim 1, wherein the step of positioning the web in the mounting region comprises:
   arranging a web position guide in a predefined location of the mounting region;
   arranging the web in abutment with the web position guide; and thereafter removing the web position guide.

11. The method of claim 10, wherein the step of securing the position of the web in the mounting region is performed prior to removing the web position guide.

12. The method of claim 1, wherein the web is a trailing-edge web for supporting the trailing edge of a wind turbine blade.

13. The method of claim 1, wherein the one or more web restraining devices comprises a plurality of web restraining devices, the plurality of web restraining devices being spaced at intervals along the length of the web.

* * * * *